United States Patent Office 3,783,013
Patented Jan. 1, 1974

3,783,013
COATING FOR SURFACES WHICH CONTACT HOT GLASS
Thomas A. Seeman, Oregon, Ohio, assignor to Thomas Industrial Gases, Inc., Toledo, Ohio
No Drawing. Continuation-in-part of abandoned application Ser. No. 169,862, Aug. 6, 1971. This application Mar. 27, 1972, Ser. No. 238,467
Int. Cl. B28b 7/38
U.S. Cl. 117—127                 12 Claims

ABSTRACT OF THE DISCLOSURE

A composition and method is disclosed for coating metal surfaces which come in contact with hot glass in manufacturing and handling glassware. A dispersion of boron nitride (BN) and monoaluminum phosphate is applied to heated metal surfaces to form a coating which prevents corrosion and glass seizure. The dispersion is applied in an inert volatile liquid, preferably ethylene glycol or water or a combination thereof.

CROSS-REFERENCE TO RELATED APPLICATION

This is a continuation-in-part of my copending application Ser. No. 169,862 filed Aug. 6, 1971 now abandoned.

BACKGROUND OF THE INVENTION

This invention relates to coatings and more particularly to an improved coating and method for coating metal surfaces which come in contact with hot glass to lubricate and protect such metal surfaces and to protect the hot glass from surface marks.

In the manufacture of glassware, and in the forming and handling of hot glass, the metal surfaces which come into contact with the glass at elevated temperatures must be maintained free from surface oxidation and roughness. In a typical glassware operation, a gob of molten glass at a temperature of about 1600–1700° F. is delivered to a glass mold by a shear blade action. After molding, the hot glass is removed from the mold at a temperature of about 1300° F., and is transferred to a former and subsequently to an annealing oven.

The most severe operating conditions are encountered during the manufacture of the glassware. During the forming operation, the hot glass must readily slide over the former and, upon partial cooling, the glass must separate easily therefrom. The finished article must be free from surface irregularities, scratches, drag marks and stains. High volume production requires that surfaces on the forming apparatus have sufficient protection to prevent damage to the glass surfaces.

In particular, the metal formers used in the glass forming operation must be capable of withstanding severe operating conditions. In addition to severe temperature changes, the former surface must resist corrosive alkali attack from the hot glass. As the hot glass cools rapidly, the coefficient of friction rapidly increases. In order to control the coefficient of friction and to protect the former surfaces from oxidation and corrosion, the surfaces of the former are coated.

The prior art suggests coating glass formers with such diverse lubricants as a colloidal dispersion of graphite in mineral oil, molybdenum disulfide, glycols and silicone emulsions. Because of low cost and simplicity of preparation, graphite dispersed in mineral oil has been used extensively. However, the use of this lubricant has several drawbacks. The high glass forming temperatures vaporize the mineral oil, causing objectionable smoke. The vaporized oil also presents a fire hazard by accumulating on wall and ceiling areas. Volatilization of the mineral oil leaves a carbon and graphite decomposition product on the former surface which lubricates the surfaces. However, at operating temperatures the graphite is capable of being absorbed into the metal of the former to form a carbon-metal complex causing imperfect glassware. In addition, the carbon forms excessive scale deposits on the surfaces of the former which may ultimately chip off and create uneven surfaces, causing imperfect glassware.

Of the other known coatings, the use of molybdenum disulfide has been unsatisfactory because of temperature limitations. Glycols and silicone emulsions have been used successfully but suffer from the disadvantage of requiring special equipment and complex handling procedures. Many of these prior art coating and lubricating compositions have the disadvantage of requiring repeated applications, contributing to increased labor costs and inefficient use of production equipment. Organic type compounds have been tried but are generally undesirable because they are readily decomposed or oxidized at temperatures involved in glassware manufacturing operations. In order to meet glass industry requirements for lubrication and protection of glass formers and glassware conveying equipment, a coating must have good heat stability, oxidation resistance, water-repellency, and long coating life, in addition to lubricity.

Another disadvantage with prior art coatings for glass formers is that such coatings must be applied to relatively cool formers. However, during operation of the formers may be at as high as 1200° F. to 1300° F. Prior art coatings could not be applied to formers at this temperature. This necessitates costly interruptions in the forming operation for periodically cooling and recoating the formers.

SUMMARY OF THE INVENTION

The instant invention is based upon the discovery that former surfaces, delivery equipment and other metal surfaces which come into contact with hot glass during the manufacture of glassware can be protected and lubricated by a coating of a boron nitride and monaluminum phosphate dispersion. The boron nitride acts as a lubricant, while the monoaluminum phosphate acts as an adhesive for the boron nitride, and both work together to protect metal from corrosion. The ratio of boron nitride to monoaluminum phosphate is selected to give desired lubricating, adhesion and protection properties. The coating is applied as a liquid dispersion to surfaces whch are heated sufficiently to at least vaporize the liquid, leaving a dry coating, and which may be heated to a normal operating temperature, such as 1200° F. for former surfaces. The liquid is an inert volatile liquid, preferably ethylene glycol or water or a combination thereof. As used herein, "dispersion" is used generically to include suspensions, solutions and mixtures.

It is, therefore, a primary object of the present invention to provide an improved protective composition for coating metal surface areas.

Another object of the invention is to provide an improved method for protecting and lubricating metal surfaces which come into contact with hot glass.

It is another object of the invention to provide an improved coating for glass formers whereby the formers are protected from oxidation when exposed to an adverse environment.

It is still another object of the invention to provide a protective coating for metal surfaces which come in contact with hot glass whereby the coefficient of friction between the surface and the glass is lowered.

Other objects and advantages of the invention will become apparent from the following detailed description.

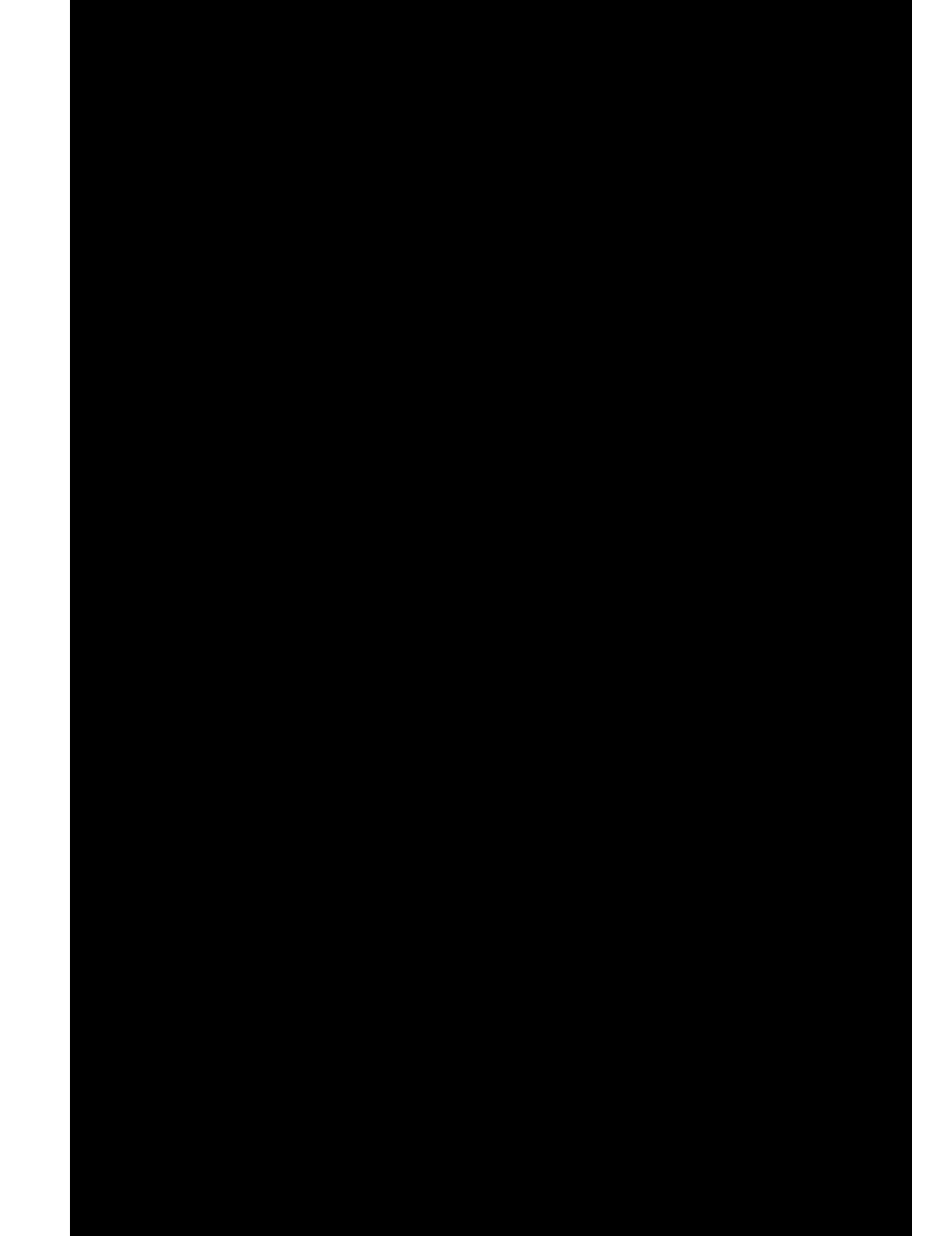

been used. Alternatively, a subsequent coating having approximately 88% boron nitride to 12% monoaluminum phosphate ratio was also used.

The coated glass formers were used in tests while producing glass tumblers. The formers with the 85% boron nitride to 15% monoaluminum phosphate final coating were used continuously for 1½ days before a new coating was required. When the similar formers having a final coating formulation of 88% boron nitride to 12% monoaluminum phosphate were tested, the coating had to be renewed after about 4 hours of continuous use. As mentioned earlier however, the coating having only 85% boron nitride was not as lubricious as the coating having 88% boron nitride. In either case, the coating was renewed without cooling the formers.

Glass formers coated with a base and subsequent coatings are well protected from corrosion. The efficacy of such coatings is evidenced by test results which show that formers resist fluoride ion attack from high fluoride containing glass. Furthermore, between uses the formers were stored in open sheds where they were exposed to the weather without corroding. Thus, the coating eliminated the expense and time required to clean the stored molds before reuse.

What I claim is:

1. An improved composition for coating metal surfaces which come in contact with hot glass during the manufacture of glassware comprising a dispersion essentially of from 12% to 53% by weight monoaluminum phosphate and from 47% to 88% by weight boron nitride.

2. An improved composition for coating metal surfaces, as defined in claim 1, wherein said monoaluminum phosphate and said boron nitride are dispersed in an inert volatile liquid.

3. An improved composition for coating metal surfaces, as defined in claim 2, wherein said inert volatile liquid is water.

4. An improved composition for coating metal surfaces, as defined in claim 2, wherein said inert volatile liquid include ethylene glycol.

5. An improved composition for coating metal surfaces, as defined in claim 2, wherein the coating comprises a dispersion essentially of from 12% to 27% by weight monoaluminum phosphate and from 73% to 88% by weight boron nitride.

6. An improved composition for coating metal surfaces which come in contact with hot glass during the manufacture of glassware comprising a dispersion essentially of from 12% to 18% by weight monoaluminum phosphate and from 82% to 88% by weight boron nitride in an inert volatile liquid.

7. An improved composition for coating metal surfaces which come in contact with hot glass during the manufacture of glassware, as defined in claim 6, wherein said monoaluminum phosphate and said boron nitride are dispersed in an inert volatile liquid selected from the group consisting of water, ethylene glycol and a mixture thereof.

8. A method for coating metal surfaces which come in contact with hot glass during the manufacture of glassware comprising heating said surfaces to above the vaporizing temperature of an inert volatile liquid, and applying to said heated surfaces a dispersion in said liquid comprising essentially of from 12% to 53% by weight monoaluminum phosphate and from 47% to 88% by weight boron nitride.

9. A method for coating metal surfaces, as defined in claim 8, wherein said dispersion is applied in a first coating comprising essentially from 18% to 27% by weight monoaluminum phosphate and from 73% to 82% by weight boron nitride and in at least one additional coating comprising essentially from 12% to 18% by weight monoaluminum phosphate and from 82% to 88% by weight nitride.

10. A method for coating metal surfaces, as defined in claim 8, wherein said dispersion is in water.

11. A method for coating metal surfaces, as defined in claim 8, wherein said dispersion is in ethylene glycol.

12. A method for coating metal surfaces, as defined in claim 8, wherein said dispersion is in a mixture of ethylene glycol and water.

References Cited

UNITED STATES PATENTS

| | | | |
|---|---|---|---|
| 2,726,160 | 12/1955 | Ueltz | 117—DIG. 10 |
| 1,570,802 | 1/1926 | Bichowsky | 117—DIG. 10 |
| 3,674,518 | 7/1972 | Vuaroqueaux | 106—38.27 |
| 3,310,870 | 3/1967 | Parikh et al. | |
| 1,453,593 | 5/1923 | Meloche | 106—38.27 |
| 2,246,463 | 6/1941 | Garratt. | |
| 3,091,548 | 5/1963 | Dillon | 117—71 M X |
| 2,201,049 | 5/1940 | Moore | 117—DIG. 10 |
| 3,389,006 | 6/1968 | Kohler | 117—127 X |
| 3,464,839 | 9/1969 | Gamble | 117—127 X |

RALPH S. KENDALL, Primary Examiner

U.S. Cl. X.R.

117—5.3, DIG. 10; 65—374; 106—38.27

UNITED STATES PATENT OFFICE
CERTIFICATE OF CORRECTION

Patent No. 3,783,013          Dated January 1, 1974

Inventor(s) Thomas A. Seeman

It is certified that error appears in the above-identified patent and that said Letters Patent are hereby corrected as shown below:

Column 2, line 28, "of" should be deleted;
           line 48, "whch" should be "which".
Column 5, line 40, "include" should be "includes".
Column 6, line 24, after "weight", insert -- boron --.

Signed and sealed this 25th day of June 1974.

(SEAL)
Attest:

EDWARD M. FLETCHER, JR.　　　　　　　C. MARSHALL DANN
Attesting Officer　　　　　　　　　　　Commissioner of Patents